United States Patent [19]

Tansony et al.

[11] Patent Number: 4,680,475

[45] Date of Patent: Jul. 14, 1987

[54] APPARATUS FOR DETECTING AN INTERFACE IN FLUIDS UTILIZING PLURAL MULTIPLEXED LIGHT EMITTERS AND RECEIVERS

[75] Inventors: John R. Tansony; Scott A. Langstaff; Robert W. Tansony, all of Mississauga, Canada

[73] Assignee: Markland Specialty Engineering Ltd., Mississauga, Canada

[21] Appl. No.: 760,855

[22] Filed: Jul. 31, 1985

[51] Int. Cl.[4] ...................... G01N 15/06; G01N 21/00
[52] U.S. Cl. ..................................... 250/577; 356/435
[58] Field of Search .......................... 250/577; 73/293; 340/619; 356/435, 442

[56] References Cited

U.S. PATENT DOCUMENTS

| | | | |
|---|---|---|---|
| 3,465,587 | 9/1969 | Pierce | 73/295 |
| 3,777,177 | 12/1973 | Norkum et al. | 307/118 |
| 3,947,692 | 3/1976 | Payne | 250/577 |
| 4,047,434 | 9/1977 | Marsh et al. | 73/304 |
| 4,355,238 | 10/1982 | Ruell | 73/293 |
| 4,372,790 | 2/1983 | Manning et al. | 307/118 |

FOREIGN PATENT DOCUMENTS

| | | | |
|---|---|---|---|
| 2611729 | 10/1976 | Fed. Rep. of Germany | 73/293 |
| 0069521 | 6/1981 | Japan | 73/293 |
| 0190224 | 11/1982 | Japan | 73/293 |

OTHER PUBLICATIONS

Portable Sludge Level Detector: Markland Specialty Engineering Ltd., Toronto, Canada, 1979.

*Primary Examiner*—David C. Nelms
*Assistant Examiner*—S. Allen
*Attorney, Agent, or Firm*—Kenneth M. Garrett

[57] ABSTRACT

A probe for detecting separated sludges such as in sewage, is axially elongated and has a large number of LED-phototransistor pairs axially spaced thereon in facing relationship with a gap therebetween. The phototransistors are commonly connected, and the LEDs are sequentially fired by multiplex switching located within the probe. Since the quiescent current of the phototransistors is normally low, the common phototransistor output will essentially be proportional to the amount of light reaching a specific phototransistor. The output signals are processed to automatically locate an interface between separated sludge and clarified liquor. Circuitry is included to adjust the power level at which the LEDs are activated responsive to the output from selected ones of the phototransistors, for the purpose of reducing beam intensity if the sludge becomes thin, and also for increasing the intensity to overcome fouling of the windows of the probe.

28 Claims, 7 Drawing Figures

APPARATUS FOR DETECTING AN INTERFACE IN FLUIDS UTILIZING PLURAL MULTIPLEXED LIGHT EMITTERS AND RECEIVERS

FIELD OF INVENTION

This invention relates to method and apparatus for detecting changes in fluids. It particularly relates to and is described in reference to apparatus suitable for use in measuring stratified sludge separated in sewage tanks, but it is not necessarily limited thereto.

BACKGROUND OF INVENTION

The management of sewage wastes necessitates the determination of the accumulation of separated sludge in sewage settling tanks. In accordance with one method, a photometric device is used. Such device comprises a light source and a light detector opposed to the source across a gap into which the liquid of the tank may freely flow. In one such apparatus a single device contained in a probe is lowered into the tank manually or by a winding mechanism, and when a predetermined attenuation of the detector output is measured, it is considered that the probe has entered the sludge bed. In another apparatus a fixed mast is employed having three photometric devices axially spaced thereon to given an indication of whether the sludge bed is at a low, medium or high level; signal from the apparatus may be used to automatically control the sludge level in the tank.

Certain disadvantages are attendant upon the use of the foregoing apparatus. Thus both necessitate the use of skilled operators, and rely significantly upon the interpretation of the measurements outputted from the devices. Such measurements may well be spurious due to local disturbances in the settled solids, due to solid materials floating in the liquid and air bubbles, for example. The mechanical apparatus is subject to malfunction, particularly when used under freezing conditions. The fixed probe gives little information regarding the rate of sludge build up, and in addition an accumulation of scum on the windows behind which the component parts of the photometric devices locate rapidly attenuates the detector outputs, necessitating relatively frequent withdrawal of the mast to clean the windows. The fixed probe must also be removed and the photometric devices relocated thereon when it is wished to change the depth settings of the sludge to be measured and controlled in the tank.

In accordance with another method, a sonar device is used. However, the composition of a typical sludge bed often comprise not more than about 1% solids, hence there is little material from which to reflect sound waves. Moreover, when the sonar is separated by a froth flotation technique, the sonar method is rendered unusable since the air bubbles absorb the sonic signal. It may also be noted here that the traditional photometric apparatus is not very effective for use in connection with froth floatation methods of separating solids.

It is a primary object of this invention to provide improved apparatus for determining the accumulation of separated sludge in sewage tanks or the like.

It is a further object of the invention to provide automated apparatus of the foregoing type.

It is another object of the invention to provide apparatus which does not involve mechanically moving parts and that is consequently more reliable in operation and less susceptible to freeze up problems.

It is another object of the invention to provide apparatus which provides an output that is less susceptible to local variations that may be encountered in the fluid with which the apparatus is employed.

It is another object of the invention to provide apparatus wherein means is incorporated for compensating for scum build up on the probe.

It is another object of the invention to provide apparatus wherein the depth settings to be measured and controlled can be easily varied.

It is another object of the invention to provide apparatus for use in connection with froth floatation sludge separation techniques.

SUMMARY OF THE INVENTION

In accordance with one aspect of the invention, a probe for determining a change in fluid properties along its length comprises an axially extending sheath, and metering means comprising transmitting means which comprises a large plurality of axially spaced apart radiating devices contained within the sheath. While there is no critical limit to the term "large plurality", it is envisioned that for a sewage tank probe having a height of about 125 cms, some 60 radiating devices will be used, spaced apart by about 2 cms, as this will provide adequate accuracy in determining the height of the sludge bed in the tank. For other purposes the spacing between the devices could be decreased or increased, depending upon the accuracy of the measurement desired. The metering means further includes receiving means comprising a corresponding plurality of detecting devices transversely opposed to the respective radiating devices and spaced therefrom across a gap defined by the sheath, which is provided on each side of the gap with windows impervious to the fluid and at least partially transparent to the radiation emitted by the radiating devices.

The probe includes a pair of electrical busses entering the sheath, and first circuit means connecting one buss in parallel relation to the devices of one of the transmitting means and the receiving means. Second circuit means includes a multiplexing means for connecting the other buss sequentially to the devices of the other of the transmitting means and receiving means, so as to sequentially generate on the buss connected to the receiving means an output from each of the detecting devices in turn, thereby effectively polling each of the devices of the metering means.

Preferably the gap is formed as a continuous passage in the sheath, whereby the fluid can flow without impediment. Also preferably, the windows may be continuously formed. Where the probe is specifically for use in connection with sludge separator tanks, the devices of the transmitting means may suitably comprise light emitting diodes (hereinafter LEDs), preferably having an output in the infrared range, and the devices of the receiving means may comprise phototransistors.

Preferably it is the phototransistors that are connected in parallel relationship by the first circuit means to the one buss, as the quiescent current of these devices, which is to say the current consumption of the device in the non-illuminated state, is normally very low. In comparison, where the LEDs are connected together in parallel relationship, the current consumption of the probe would be relatively high, and in addition the life of the LEDs would be somewhat reduced.

The sequential polling of the metering devices results in the outputting of a value from each device representative of a condition in the fluid at the axial locations of the devices. While in the separation of certain sludges or other slurried materials a sharp, physically distinct interface may be discerned, in many instances there is merely a gradual change in the concentrations of the components. The information resulting from the large number of axially spaced apart measurements may be utilized to determine the concentration gradient over the axial length of the probe, should this be desired. Apparatus for use in connection with the probe broadly comprises means for comparing the outputted values, which comparison may be made on the basis of a precise calculation of the attenuation of light transmitted to each phototransistor, or merely on the basis of the relative outputs of the phototransistors.

Practically speaking, in determining the position of an interface in sewage sludge separation, the values may be serially interrogated to determine when a threshold value is first located. Desirably, that threshold value should be maintained over at least two successive axial locations, which is to say that the values output from two at least axially adjacent metering devices should have a value equal to or less than a predetermined maximum threshold value, or equal to or greater than a predetermined minimum threshold value. In this manner spurious signals such as might be generated by transient, local events such as spot fouling, air bubbles and the like may be avoided. Spurious signals may be also avoided by determining the rate of change of axial location of the event over a small period of time. This if the time differential of two or more successively determined axial locations is less than a predetermined minimum, it may be assumed that the event is not transient, and that a true event has been detected.

Generally the values will be output from the metering devices as analogue signals; these are conveniently converted to digital values, and memory locations are provided for storing the digital values obtained from the last scanning cycle and the stored values are analyzed by suitable logic softwear or hardwear as outlined above, and as will be further described in relation to preferred embodiments of the invention, taken in conjunction with the accompanying drawings.

DESCRIPTION OF THE PREFERRED EMBODIMENT

Figure 2:
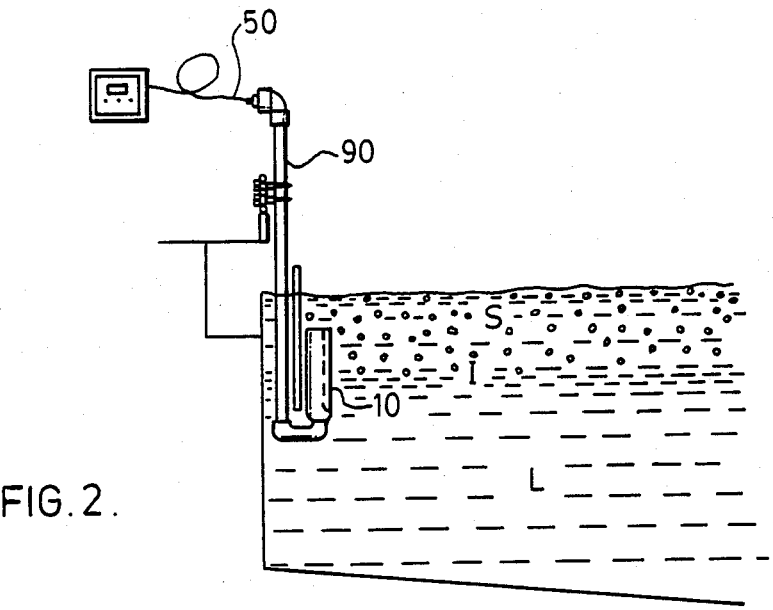
FIG. 2 shows the probe mounted for use in a foam floatation sludge separation tank.

Referring now to the drawings in detail a detector probe suitable for use in detecting the presence and the position of an interface between separated sludge and liquor in a sewage tank is denoted therein by the numeral 10. Probe 10 is axially elongated and may typically have a length of some 1.25 m, and comprises an impermeable sheath 12 having a continuously formed axially aligned groove 14 therein. The walls of the sheath 12 on each transverse sides of groove 14 are constructed of light transparent window material 16, which is continuously formed for convenience of construction and for cleaning purposes.

Within the sheath 12 there is contained a large plurality of photometric devices comprising light emitting diodes 18 ("LEDs") which are axially spaced apart to locate on one side of groove 14. In the embodiment of the invention under consideration the number thereof is 64, although this number is not critical and it may be reduced or increased in accordance with particular circumstances. Transversely opposed to each LED 18 on the other side of groove 14 there is located a phototransistor 20 comprising the other component of the photometric device. The LEDs 18 are broad band infrared emitting diodes having a peak emission at about 880 nm, at which value the organic materials normally contained in sewage sludges show a good absorbence. The LEDs 18 and/or phototransistors 20 may be housed in transverse openings 22 for location purposes, if desired, and also to reduce the illumination of a phototransistor 20 by axially displaced LEDs 18 (skewed illumination). It may here be noted that where the LEDs have envelopes incorporating a lens, light emission therefrom is highly directional and skewed illumination is not found to be problem. Also, as herein the axial spacing between the devices is arranged to be 6 times the diameter of the LED, which reduces skewed illumination.

Figure 5:
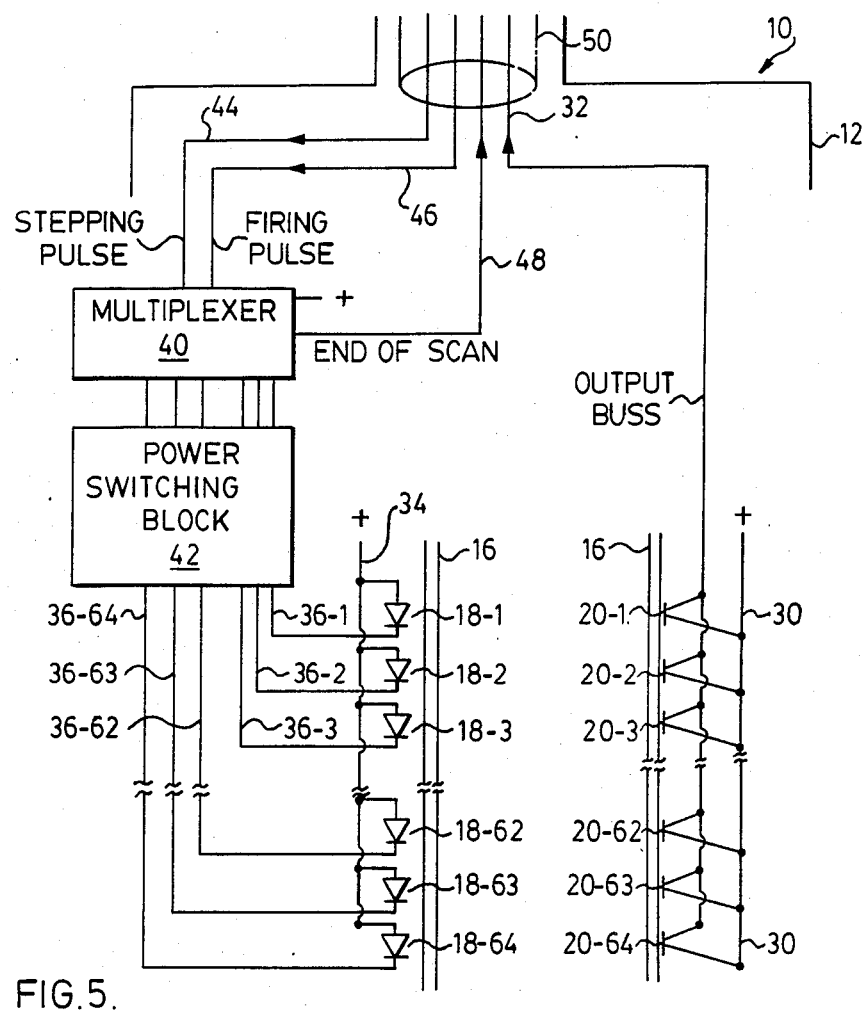
FIG. 5 shows in schematic form the electrical arrangement of parts within the probe.

Referring now to FIG. 5 the first and last 3 photometric devices of the probe 10 only are shown therein, being identified as LEDs 18-1 etc. and phototransistors 20-1 etc. Phototransistors 20 are connected together in parallel relationship, one electrode of each phototransistor being commonly connected to a power supply conductor 30, the other electrode being commonly connected to an output buss conductor 32. One electrode of each LED 18 is connected to a power supply conductor 34. The other electrode of the LEDs are individually connected by conductors 36-1, 36-2 etc. to a multiplexing switching device 40. Multiplexing switching device 40 (otherwise referred to simply as multiplexer 40) will typically comprise one or more low powered integrated circuit devices. Consequently, a power switching block 42 is serially located in conductor lines 36-1, 36-2 etc. to provide suitable power amplification for driving the LEDs upon receipt of a signal from the multiplexer 40. Multiplexer 40 connects to a first input conductor 44 for receiving a stepping pulse thereon, an input buss 46 for receiving a firing pulse thereon, and an output conductor 48 for outputting an end of scan signal thereon, conductors 32, 34, 44, 46 and 48 exiting the sheath 12 of probe 10 through a cable 50.

Figure 6:
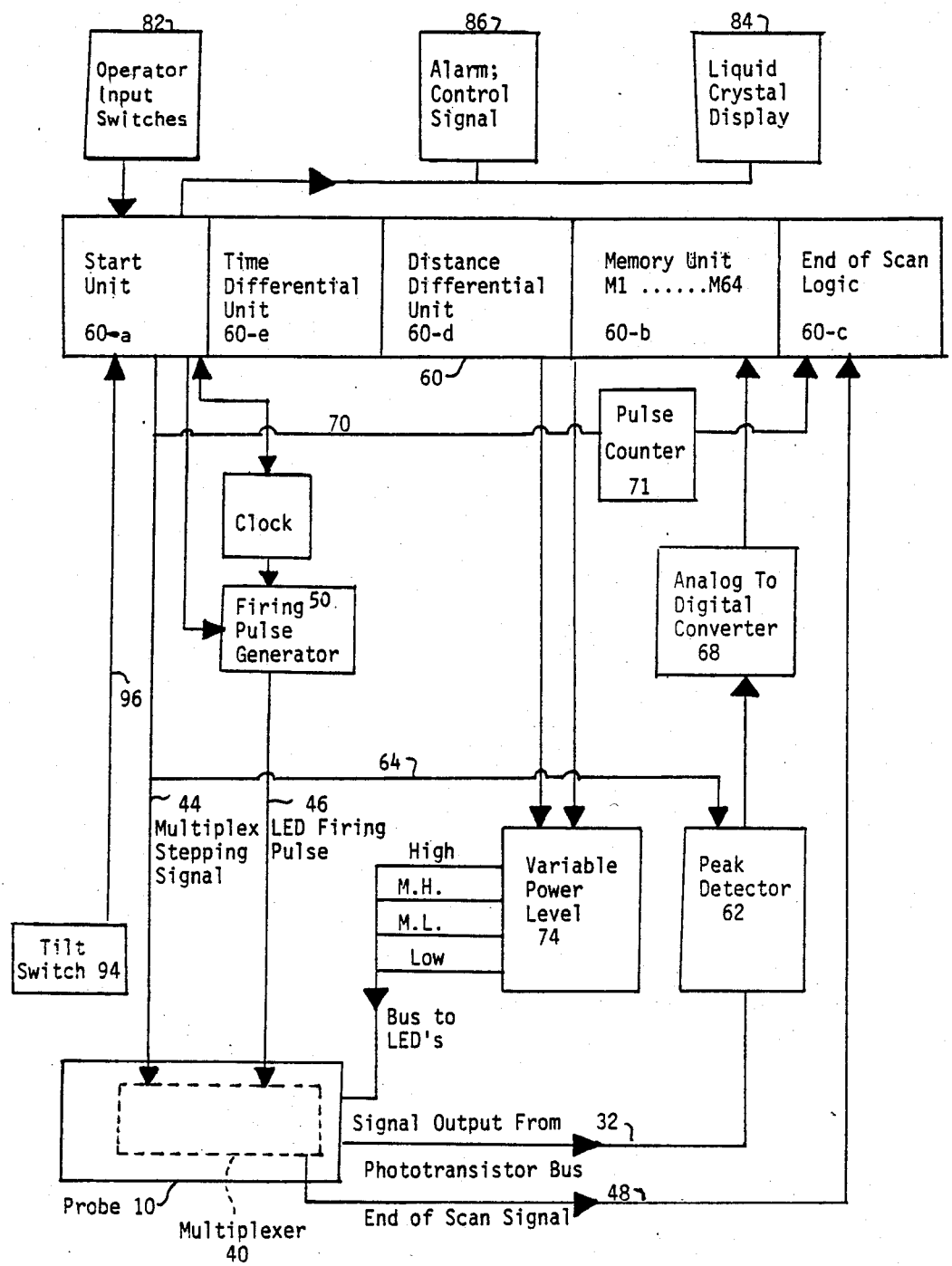
FIG. 6 shows in block form the operation of measuring apparatus used with the probe.

With reference now to FIG. 6 a stepping signal generated in a start unit 60-a of a microprocessor 60 is output on line 44 at the commencement of a cycle, causing multiplexer 40 to connect output conductor 36-1, to input buss 46, on which a firing pulse is from firing pulse generator 50 is received. Each firing pulse is amplified by power switching block 42 causing LED 18-1 to flash on at the receipt of a firing pulse. About 3 firing pulses are output for each stepping pulse. Phototransistors 20 will normally be non-illuminated and in a quiescent state, and the current output on output buss 32 will under such condition be very small until such time as phototransistor 20-1 is illuminated, at which time the output on buss 32 will be essentially the output from phototransistor 20-1.

Output buss 32 connects to a peak detector 62. This output is held by the peak detector 62 and passed to an analog to digital converter 68. The digital value output from phototransistor 20-1 is stored in memory location M-1 of memory unit 60-*b* of microprocessor 60. When the stepping signal output on conductor 44 goes high, a signal is received on line 64 at peak detector 62 to zero the peak detector and clear residual values on output buss 32 in preparation for receipt of the next signal. When the stepping signal output on conductor 44 goes low, the peak detector is enabled for receipt of an output from the next phototransistor 20-2 which is to be scanned. Each LED is similarly activated in turn by multiplexer 40, until all memory locations M-1 through M-64 of memory unit 60-*b* have values stored therein respectively indicative of the outputs of each photometric device. On completion of the scan cycle as determined by multiplexer 40, the multiplexer outputs an end of scan signal pulse on conductor 48 which is received in an END OF SCAN logic unit 60-*c* of microprocessor 60. Here the end of scan pulse is compared with an output from a pulse counter 71 connected in line 70 to receive stepping pulses output on conductor 44, the pulse counter and its associated circuitry being located outside of probe 10. In the event that the end of scan signal is received early or late on conductor 48, due, for instance to electrical interference picked up and acted on by multiplexer 40, unit 60-*c* outputs a restart signal on path 72 to initiate unit 60-*a* to output stepping pulses at an increased frequency until such time as an end of scan pulse is detected in logic unit 60-*c*, at which time the start unit 60-*a* is re-oriented to commence a normal scan, and to overwrite correct values in memory locations M-1 through M-64. Should an end of scan signal not be received in or detected by logic unit 60-*c* within a predetermined number of cycles, an alarm may be signalled.

Figure 1:
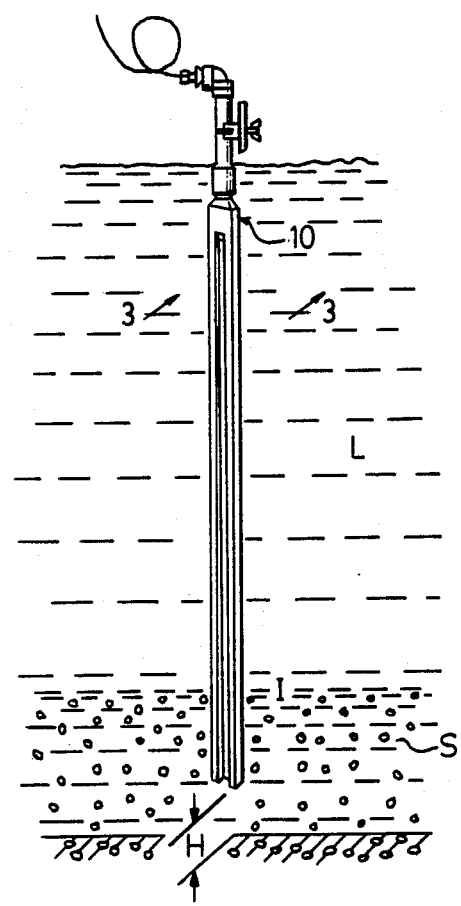
FIG. 1 shows a probe in accordance with the invention mounted for use in a sewage tank, where separation of the sludge takes place by the influence of gravity.
Figure 3:
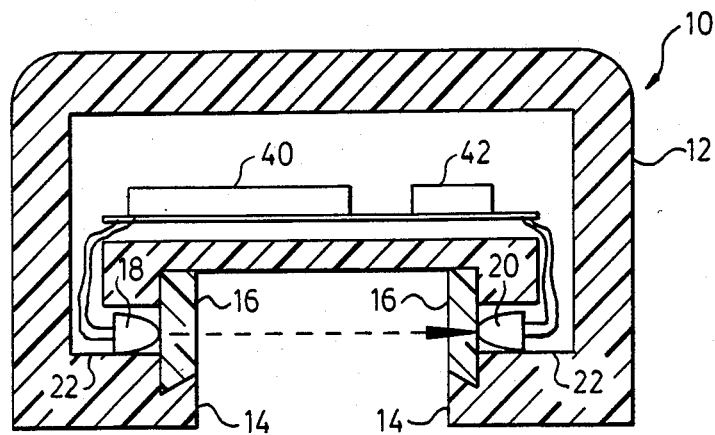
FIG. 3 is a cross section of the probe in line 3—3 of FIG. 1.
Figure 4:
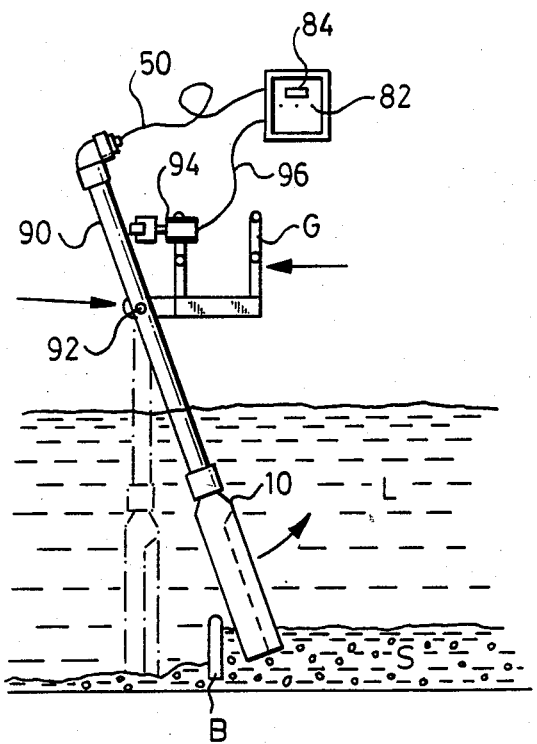
FIG. 4 shows a modification of the mounting of the probe in a gravity separation tank.

Assuming that probe 10 is submerged in a sewage settling tank, as generally illustrated in FIG. 1, the bottom several photometric devices will locate in the sludge layer S, the top several photometric devices will normally locate in the supernatant liquor L, and the interface will locate somewhere between. The digital values contained in memory locations M-1 through M-64 are in the range 0 to 255. A value of 0 is indicative of no output from a phototransistor 20, and the light directed thereto has been fully attenuated by the presence of sludge. A value of 225 is indicative of full output from a phototransistor 20, and that there is no sludge present at the axial location on the probe associate with that reading. The average value of the memory locations M-1 through M-4 is computed in an arithmetic unit 60-*d* of microprocessor 60, and compared with the average value of memory locations M-59 through M-64. If at least a minimum predetermined difference is detected by the comparison, then there is an interface located between the axial ends of the probe 10. If the difference is less than that minimum value then there is no interface, and the probe is either totally in sludge, or totally in liquor. These two conditions are readily discriminated by a determination of the actual value of any memory location; if such value is greater than about an arbitrarily assigned value of 128, there is no sludge; if less than 128, the probe is totally immersed in sludge.

Figure 7:
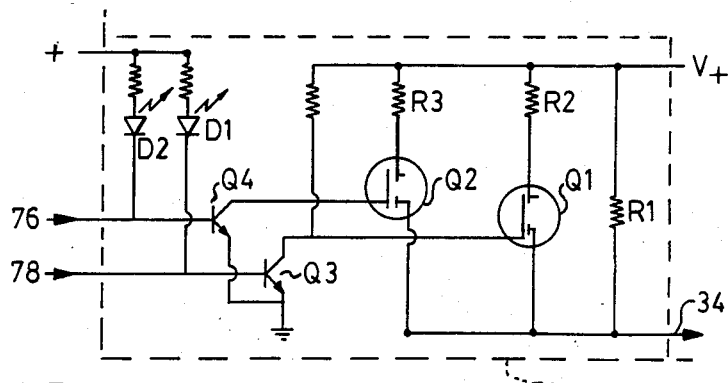
FIG. 7 shows in schematic form the electrical circuit of one of the blocks of FIG. 6.

It will be recognized that the intensity of radiation emitted from LEDs 18 should be suitably controlled if the value stored in memory unit 60-*b* are to be properly distributed in the range of 0 to 255. To this end, a variable power level selector 74 is provided responsive to control signals emitted by unit 60-*d* on conductors 76 and 78. A suitable circuit is shown in FIG. 7, and comprises resistors R1, R2 and R3 connected in parallel between a voltage supply source, V+, and LED supply conductor 34, resistors R2 and R3 having different values. Resistor R1 is connected directly between the V+ line and conductor 34, whereas resistors R2 and R3 are serially connected by HEXFET transistors Q1 and Q2, which are driven to conduct by transistors Q3 and Q4 respectively on receipt thereby of a signal on lines 78 and 76 respectively. The activation of line 76 or line 78, or both, will then switch one or other or both of resistors R2 and R3 into circuit with R1 to provide four different power settings on line 34.

The power level is established periodically by computing the average value stored in memory locations M-61 through M-64, following a scan with LEDs 18 operated at full power, which is to say with a high signal output on both lines 76 and 78. If this average value is greater than a predetermined value the output on line 76 is switched to low, thereby selecting a medium-high power setting, and a second scan initiated and the average value in memory locations M-61 through M-64 again compared to a predetermined value. If greater than the predetermined value the output on line 78 is switched to low, and that on line 76 to high, to select a medium low power setting, and a third scan initiated and the average value in M-61 through M-64 again compared to a predetermined value. If greater than the predetermined value, the output on lines 76 and 78 is driven low, thereby selecting the lowest power setting for the operation of LEDs 18. Light emitting diodes D1 and D2 connect to lines 76 and 78 to provide a visual indication of the power level established.

The selection of the lowest power level at which an adequate differential may be made between the values output from two photometric detecting devices, the one immersed in sludge, the other immersed in liquors from which the sludge has separated, is particularly beneficial in the case of thin sludges, which may be invisible at the highest power levels. The capability of automatically increasing the power level setting is beneficial in proving automatic compensation for the build-up of scum on the windows 16 of the probe 10, so permitting the use of the probe over extended periods of time without necessitating its withdrawal from a tank for maintenance purposes. The higher power levels of operation also permit the use of the probe 10 in connection with the the froth floatation separation of sludges, wherein the separated sludges contain appreciably greater concentrations of solids than is found in gravity settling tanks. A suitable set up is shown in FIG. 2, where the probe 10 is inverted in comparison to its use in a settling environment as shown in FIG. 1. In froth floatation of sludges, air bubbles passing upwardly through the tank tend to interfere with photometric measurements, and to give spurious results. However this is to some extent compensated for by the relatively large number of photometric devices located on the probe 10, and the manner in which the values outputted from the detecting devices are processed. As earlier indicated, it is preferred that predetermined values be maintained over three successive memory locations before a signal indicative of the location of the interface is output. In order to further dampen the response to short term transients, the located interface position determined by each of the last four successive scan cycles is stored and compared in time differential unit 60-e of the microprocessor 60, and an output is given from unit 60-e only if the change between adjacently determined positions is within predetermined limits.

Certain other refinements of the apparatus are also provided, thus, as seen in FIG. 1, the probe 10 may be physically offset by a height H from the bottom of the settling tank. A value representative of the offset is input at operator input unit 82, which is conveniently a scrolling arrangement, and stored in unit 60-e and this value is added to the located position of the interface prior to an output of a reading thereof, for example to a recorder or a liquid crystal display unit 84.

It is often desired that when sufficient sludge has accumulated in a tank, effluent flow to the tank is stopped, the supernatant liquor decanted and/or the sludge removed. Provision is made for setting a value at 82 equal to the maximum desired height of the top of the sludge bed and storing same in comparator storage unit 60-e, conveniently includes an EEPROM, comparing the value output from comparator 60-e, and outputting an appropriate signal at 86 on determining a match.

In many sewage settling tanks the output of a control signal at 86 activates a desludge pump when a there is a predetermined accumulation of separated sludge in the tank, and a scraper board B is employed to push the sludge layer towards the pump. In the instance where it is desired to control the sludge at less than the height of the scraper board B, probe 10 is mounted from a mast 90 which is hinged at 92 to superstructure such as a gantry G of the tank, thereby permitting the probe to tilt when struck by the scraper board B. Since the movement of the board B obviously has an appreciable unsettling effect on the sludge, and since the tilted probe 10 is not positioned to take proper measurement, a switch 94 is provided to detect the tilted position of the probe. Switch 94 is operatively connected to start unit 60-a by conductor 96 to stop the further scanning of the probe and to retain the last output signals at 84 and 86 until such time as tank system has returned to its normal operating condition.

It will be understood that reference to the different units 60-a, 60-b etc. of a microprocessor 60 is illustrative only of one method of processing the values output from probe 10, and for controlling the operation thereof. Control and processing may be effected by hardwired logic units, by software computing techniques, or by various combinations thereof as will be known or become known to persons skilled in the art. The invention is not therefore to be limited, at least in its broad aspects, by the description of the exemplary embodiments, as considerable departure therefrom will be possible within the spirit of the invention claimed in the claims annexed hereto.

We claim:

1. A detector probe for immersion in a fluid, said probe comprising:
    an axially elongated sheath;
    transmitting means comprising a large plurality of axially spaced apart radiating devices contained within said sheath;
    receiving means comprising a corresponding plurality of detecting devices contained within said sheath, each of which is transversely opposed to a radiating device and spaced therefrom by a gap defined by a continuous passage in said sheath into which said fluid may flow;
    said sheath including continuously formed window means at least partially transparent to the radiation of said radiating devices sealing said sheath at opposed sides of said gap;
    a pair of electrical busses entering said sheath;
    first circuit means connecting one said buss in parallel relation to the devices of one of said transmitting means and said receiving means, and
    second circuit means including multiplexing means contained within said sheath for connecting the other said buss sequentially to the devices of the other of said transmitting means and said receiving means, so as to sequentially generate on the buss connected to said receiving means a value from each detecting device.

2. A detector probe as defined in claim 1, wherein said light emitting diodes are broad band devices having a peak emissivity at about 880 nm.

3. A detector probe as defined in claim 1, wherein said first circuit means connects the devices of said receiving means together in parallel relationship.

4. Apparatus for detecting an event in a fluid, comprising:
    an axially elongated probe;
    a large plurality of metering devices axially spaced apart along said probe;
    means for sequentially polling each said metering device to obtain a value output therefrom related to a condition in said fluid, and
    means for comparing said values to determine the location along said probe at which a predetermined change in output value with incremental axial displacement first occurs and is maintained over a plurality of adjacently output values, and
    means for outputting a signal responsive to the position of said location.

5. Apparatus as defined in claim 4, including means for storing the output values from one polling cycle.

6. Apparatus as defined in claim 5, wherein said output values are analogue values and are converted to digital values prior to said storage.

7. Apparatus as defined in claim 4, wherein said metering devices consist of spaced apart pairs of photometric devices.

8. Apparatus as defined in claim 7, wherein said photometric devices comprise light emitting diodes and phototransistors.

9. Apparatus as defined in claim 8, wherein said light emitting diodes have a peak emissivity at about 880 nm.

10. Apparatus for use in detecting the interface between a liquid and a sludge separated therefrom comprising:
    an axially elongated probe having a gap therealong;
    a large plurality of pairs of light emitting devices and light detecting devices opposed thereto across said gap axially separated along said probe;
    first circuit means connecting together the outputs of said light detecting devices, and
    second circuit means located within said probe for sequentially activating each said light emitting device upon receipt of a stepping signal, so as to obtain a value output from each light detecting device on said first circuit means.

11. Apparatus as defined in claim 10, wherein said second circuit means includes means for pulse firing each said light emitting device when sequenced to.

12. Apparatus as defined in claim 10, wherein said second circuit means comprises a power supply buss, and multiplexing means responsive to the receipt of said stepping signal for sequentially operatively connecting each said light emitting device to said power supply buss.

13. Apparatus as defined in claim 11, wherein said means for pulse firing operates at a frequency greater than the frequency of said stepping signal.

14. Apparatus as defined in claim 13, wherein the ratio of said frequencies is about 3:1.

15. Apparatus as defined in claim 12, comprising means for automatically adjusting the level of activation of said light emitting device responsive to the output of at least selected ones of said light detecting devices.

16. Apparatus as defined in claim 10 further comprising means for storing the value output from each light detecting device for at least one cycle of sequential activation.

17. Apparatus as defined in claim 16, comprising means for converting said output values from analogue values to digital values prior to storage.

18. Apparatus as defined in claim 10, further comprising means for comparing said values to determine the axial location on said probe of a predetermined rate of change in value with axial displacement along the probe marking said interface therealong.

19. Apparatus as defined in claim 10, further comprising means for comparing said values to determine the axial location on said probe of the first occurence of a sustained threshold value marking said interface therealong.

20. Apparatus as defined in claim 19, further comprising means for differentiating successively determined axial locations marking said interface over a small period of time, and means responsive to the occurence of a sustained minimum differential therebetween for outputting a signal representative of the determined axial location of the interface.

21. Apparatus as defined in claim 20, further comprising means for inputting and storing an offsetting value and means for adding said value to said signal representative of said axial location to provide a signal representative of the actual position of said interface.

22. Apparatus as defined in claim 20, further comprising means for inputting and storing a control value, means for comparing said control value with the determined axial location and on the detection of a predetermined relationship therebetween, for outputting a control signal.

23. Apparatus as defined in claim 20, further comprising a mast from which said probe is dependently mounted, means for pivotally securing said mast to the superstructure of a tank, switch means for detecting the tilting of said mast, and means operatively connecting said switch means whereby when said mast is tilted the last signal output representative of the determined location of the interface is retained.

24. Apparatus as defined in claim 12, further comprising error trapping means including first circuitry located entirely outside said probe for counting stepping signals input to said probe, second circuitry for counting the steps output by said multiplexing means, and means for periodically comparing the counts of said first circuitry and said second circuitry.

25. Apparatus as defined in claim 24, comprising means operative on the receipt of an error signal from said error trapping means for increasing the frequency of said stepping signals.

26. Apparatus as defined in claim 12, wherein said probe includes transverse recesses therein for mounting said light emitting devices and said light detecting devices.

27. Apparatus as defined in claim 12, wherein the ratio of the axial separation of said light emitting devices to the diameter of the body thereof is at least equal to 6.

28. Apparatus as defined in claim 15, further including visual means responsive to power level adjusted to.

* * * * *

UNITED STATES PATENT AND TRADEMARK OFFICE
CERTIFICATE OF CORRECTION

PATENT NO. : 4,680,475

DATED : July 14, 1987

INVENTOR(S) : John R. Tansony et al.

It is certified that error appears in the above-identified patent and that said Letters Patent is hereby corrected as shown below:

Column 5, line 52, "225" should read -- 255 --.

Column 9, Claim 15, line 16, "Claim 12," should read -- Claim 10, --.

Signed and Sealed this

Twenty-fourth Day of November, 1987

Attest:

DONALD J. QUIGG

Attesting Officer        Commissioner of Patents and Trademarks